HYDRAULIC BRAKE SYSTEM WITH LOCKING MEANS

Filed March 20, 1967 6 Sheets-Sheet 1

INVENTORS
ERNST MEIER
HERMANN SEIP
BY Karl G. Ross
ATTORNEY

HYDRAULIC BRAKE SYSTEM WITH LOCKING MEANS

Filed March 20, 1967 6 Sheets-Sheet 2

INVENTORS
ERNST MEIER
HERMANN SEIP
BY Karl G. Ross
ATTORNEY

HYDRAULIC BRAKE SYSTEM WITH LOCKING MEANS

INVENTORS
ERNST MEIER
HERMANN SEIP
BY Karl G. Ross
ATTORNEY

HYDRAULIC BRAKE SYSTEM WITH LOCKING MEANS

Filed March 20, 1967 6 Sheets-Sheet 4

INVENTORS
ERNST MEIER
HERMANN SEIP
BY Karl G. Ross
ATTORNEY

INVENTORS
ERNST MEIER
HERMANN SEIP
BY Karl G. Ross
ATTORNEY

HYDRAULIC BRAKE SYSTEM WITH LOCKING MEANS
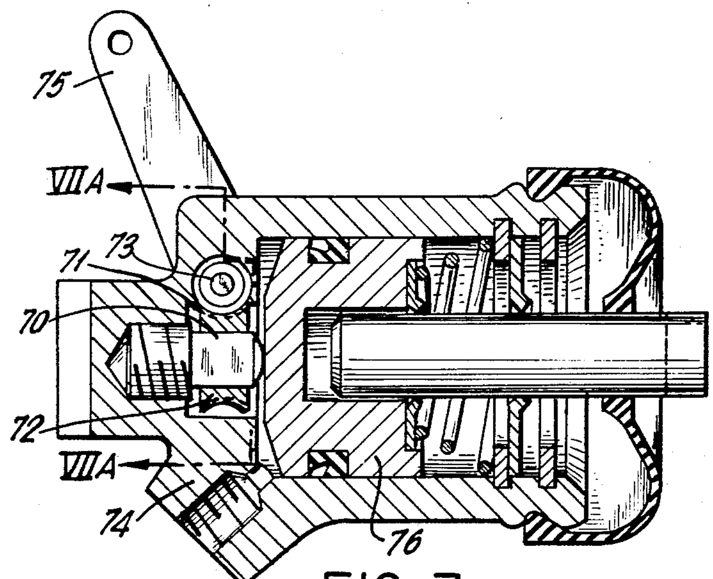
FIG. 7
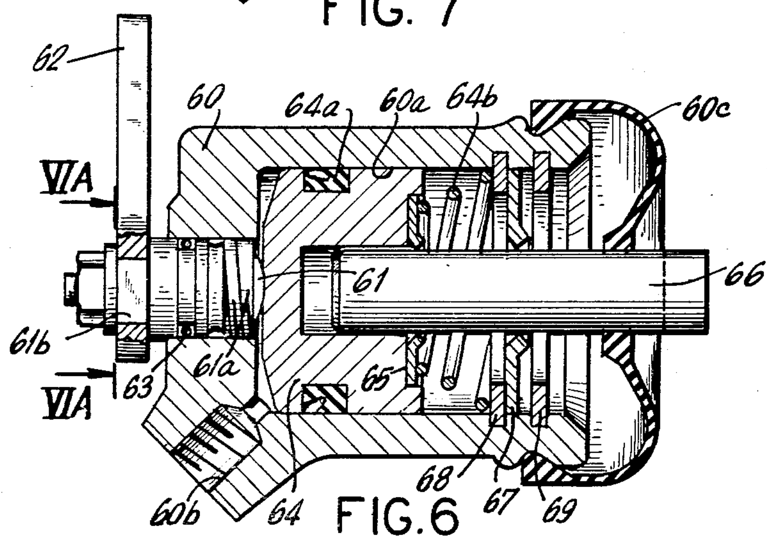
FIG.6
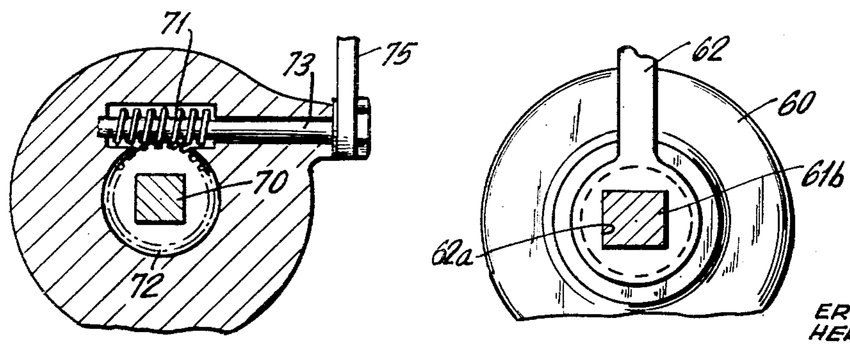
FIG. 7A
FIG.6A
INVENTORS
ERNST MEIER
HERMANN SEIP
BY Karl F. Ross
ATTORNEY

United States Patent Office 3,405,787
Patented Oct. 15, 1968

3,405,787

HYDRAULIC BRAKE SYSTEM WITH LOCKING MEANS

Ernst Meier, Frankfurt am Main, Sindlingen, and Hermann Seip, Bad Vilbel, Germany, assignors to Alfred Teves KG., Frankfurt am Main, Germany, a corporation of Germany Filed Mar. 20, 1967, Ser. No. 624,458
Claims priority, application Germany, May 7, 1966, T 31,125
12 Claims. (Cl. 188—265)

ABSTRACT OF THE DISCLOSURE

Hydraulically operated brake system with lockable disk or internal-expansion brakes having a hydraulic cylinder with an axially shiftable piston and a locking member shiftable by a lever and a worm and/or threaded-spindle mechanism to follow the movement of the piston and lock it in an advanced position to retain the brake in the engaged condition for emergency and parking purposes. Dual-brake system wherein a pair of front-wheel brakes and a pair of rear-wheel brakes are coupled to a tandem master cylinder via a pair of hydraulic networks, the mechanical locking device being operable from the driver's seat of the vehicle upon hydraulic actuation of the brake to arrest one or more of the pistons of the hydraulic brakes. A respective locking device is provided for at least one brake of each hydraulic network.

Our present invention relates to hydraulically operated brake systems provided with means for selectively locking and releasing the brakes and, more particularly, to a brake system for automotive vehicles with at least some of the wheel brakes being lockable in the closed condition.

Automotive-vehicle brakes of various types have already been proposed wherein, upon actuation of a pedal or hand-control lever, the vehicle operated can lock one or more of the wheel brakes in a closed condition. Thus, when the wheel brakes of a vehicle are of the drum or internal-expansion type, the wheel cylinders are supplied with hydraulic fluid from a master cylinder upon actuation of a brake pedal and the pistons of these wheel cylinders urge respective pairs of sectoral brake-shoes outwardly into engagement with the brakedrum. In this case, the "parking" or "emergency" braking device may include a lever fulcrumed on one of the brake shields for shifting a corresponding brakeshoe against the drum upon actuation of a cable or the like terminating at the operator's seat in a pedal or lever. A detent arrangement is provided at this pedal or lever for retaining a cable in its actuated position until release of the parking or emergency brake is desired.

In other brake systems, a pair of levers are provided for each set of braking shoes, one lever being operated by the manual or foot-controlled mechanical emergency-or parking-brake system, while the other lever is hydraulically actuated. For example, a disk brake in which a pair of brakeshoes are disposed on opposite sides of a braking disk in a yoke extending around the periphery thereof, can be provided with a first lever which urges the brakeshoes against the disk by a scissor linkage or the like, this lever being pivotally connected with the piston of the hydraulic wheel cylinder; again, the hydraulic wheel cylinders are energized by a master cylinder via conventional brake-fluid conduits. A second lever may be provided as a remote locking member to hold the brake closed independently of the first lever upon actuation of a control lever or pedal located proximally to the driver seat.

These systems are relatively complex, especially when the brake-locking mechanisms involve levers for applying the brake and when the brakes require that a primary lever transfer force from the hydraulic cylinder to the brakeshoes. In many cases, the conventional arrangements are also unreliable since, especially when pawls are used in the locking arrangement, the insertion of a pawl in a corresponding recess occurs at a location remote from the operator and cannot be adequately controlled by him. Also, the considerable wear to which such brake systems are subject, frequently results in their early breakdown.

It is, therefore, the principal object of the present invention to provide an improved hydraulic brake system having means for locking one or more of the individual brakes thereof in a closed condition whereby the aforementioned disadvantages can be avoided.

Another object of our invention is to provide a hydraulically operable brake having improved mechanical locking means for retaining the brake in its engaged position.

A further object of this invention is to provide improved automotive wheel brakes of the internal-expansion (drum) or disk type in which the aforementioned disadvantages can be avoided and the locking of the brake effected in a positive and secure manner.

We have found that these objects and others which will be apparent hereinafter can be attained with a hydraulic-brake system, especially for automotive vehicles having a plurality of wheel brakes, in which the wheel brakes are hydraulically actuated and the brake-locking mechanism is incorporated in the hydraulic brake so that one or more wheel-cylinder pistons can be mechanically locked in an advanced position under the control of an operating element (a lever or pedal at the driver seat), to retain the respective brake in its engaged position.

According to one aspect of this invention, a dual-brake hydraulic network is provided with a pair of tandem master cylinders or a single master cylinder subdivided into tandem sections and at least one wheel brake connected to each of the master-cylinder sections, both these brakes being provided with respetive locking means of this character so that the wheel-cylinder pistons are advanced by respective hydraulic networks and the locking means can be actuated to retain these pistons in their advanced positions. In this arrangement, the failure of one of the hydraulic networks, while rendering the corresponding mechanical locking means ineffective, nevertheless will permit the other brake lock to operate and function as a parking- or emergency-brake system. While reference has been made above to a pair of wheel brakes respectively operative by the tandem sections of the master-cylinder arrangement, it will be understood that several dual-brake designs will apply here as well. Thus, the vehicle may be assumed to have front- and rear-wheel brakes with the front wheel-brake cylinders connected to one master-cylinder section and the rear-wheel cylinders connected to another section, with one front- and one rear-wheel cylinder connected to each section, or one cylinder of each wheel brake being connected to one section and the other cylinder of each wheel brake being connected to the other master-brake cylinder. In this case, the mechanical locking means is utilized in at least one hydraulic cylinder connected to each of the master brake-cylinder sections.

According to another aspect of this invention, the releasable locking means for retaining the corresponding wheel-cylinder piston in its advanced position comprises a latch member frictionally locking the piston with respect to its cylinder and means for actuating this latch to engage or release it. The latter means preferably includes a threaded member for advancing a spindle parallel to the direction of displacement of the piston and adapted to act upon the latch member via a thrust-type ball bearing. The spindle itself may be driven via a lever having a worm or thread formation which is self-blocking so as to resist reverse rotation by the hydraulic pressure developed by the pistons. In this manner, no detent is required to retain the lever in its actuated condition against the restoring force developed by the pistons, and the detent system hitherto required at the actuating end of the cable or other force-transmission member can be omitted or the force sustained thereby reduced.

A more specific feature of the invention resides in the use of a multiplicity of roller bodies between a pair of convergent surfaces of the piston and the cylinder, the roller bodies being formed as cylindrical rollers, balls or the like mounted rotatably in a cage or other structure. The tapered surface may be mounted upon a bushing disposed within the interior of a cylindrical but hollow piston of the type conventionally employed in disk brakes or the like. Upon advance of the piston to thrust the respective brake show upon its disk, the cage can be correspondingly advanced via a threaded spindle and worm to permit the roller elements to wedge the bores against the piston. Upon retraction of the spindle via a flexible cable or other force-transmstting means within reach of the vehicle operator, the piston can be released to permit the usual restoring forces to disengage the brake.

In still another modification, the spindle bears directly upon the piston to retain it in its advanced position when the lever of the mechanical latching system is operated. We have also found that best results are obtained and greater locking security achieved when the lever of the mechanical locking device is swingaable in a plane parallel to the plane of vehicle travel and, therefore, parallel to the braking surface, or perpendicular to the direction of vehicle travel in a vertical plane.

The above and other objects, features and advantages of the present invention will become more readily apparent from the following description, reference being made to the accompanying drawing in which:

FIG. 6 is an axial cross-sectional view of a brake cylinder for a drum-type brake (see FIG. 3) embodying this invention;

FIG. 6A is a cross-sectional view taken along the line VIA—VIA of FIG 6;

FIG. 7 is an axial cross-sectional view similar to FIG. 6 illustrating another embodiment of this invention as applied to drum-type brakes; and FIG. 7A is a cross-sectional view taken along the line VIIA—VIIA of FIG. 7.

Figure 1:
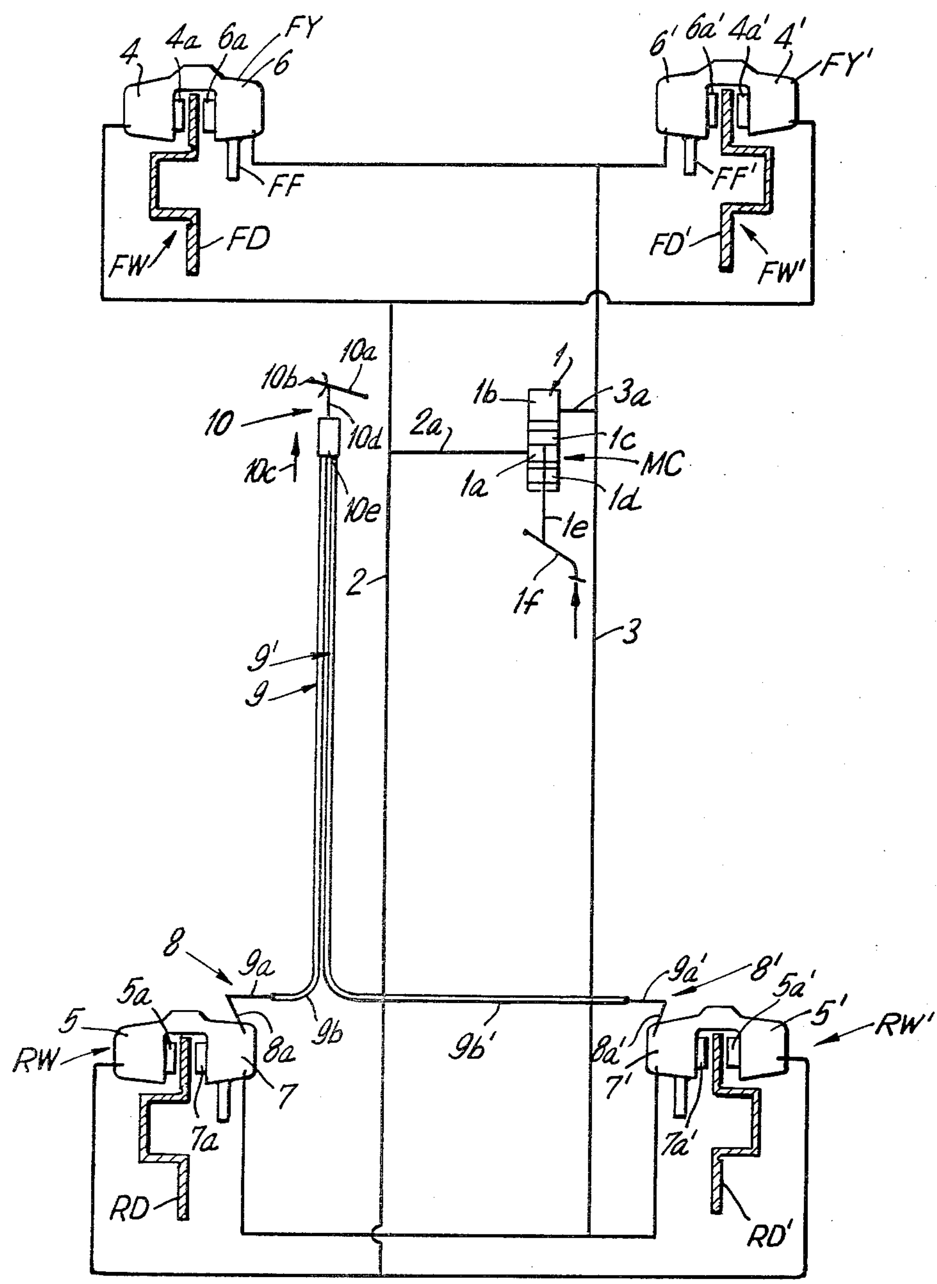
FIG. 1 is a diagram of an automotive brake system with a dual-brake network and provided with a brake-locking means according to this invention.

The dual-network brake system diagrammatically illustrated in FIG. 1 is provided on an automotive vehicle and includes front-wheel brakes FW, FW', rear-wheel brakes RW, RW', all of the disk type, and respective hydraulic networks 2, 3 connecting these brakes with the master-cylinder assembly MC. The cylinders 4 and 6, 4' and 6' of the front-wheel brakes FW and FW', respectively, urge the brakeshoes *4a* and *4a'* and *6a'*, *6a'* against the disks FD and FD'. In the usual manner, these disks are connected to the front vehicle wheel, while the yokes FY and FY' are affixed to axle housings via the flanges FF and FF' thereof. Similarly, the rear-wheel brakes RW and RW' are provided with respective cylinders 5, 7 and 5', 7' which urge the brakeshoes *5a*, *7a* and *5a'*, *7a'* against the disks RD, RD' attached to the rear wheels. The cylinders are secured to the axle housing in the manner previously described. The master-cylinder assembly of this brake system includes a single master-cylinder housing 1 which is subdivided into sections *1a* and *1b* respectively ahead of the pistons *1c* and *1d* of the master cylinder and communicates with the hydraulic networks 2 and 3 via the line *2a* and *3a*. The tandem pistons *1c* and *1d* are operated by the piston rod *1e* which, in turn is linked to the brake pedal *1f* at the driver seat of the vehicle.

The hydraulic network 2 is branched to deliver hydraulic fluid to the outboard set of front wheel-brake cylinders 4 and 4' and rear wheel-brake cylinders 5 and 5', whereas the other fluid network 3 delivers hydraulic fluid to the inboard set of wheel cylinders 6, 6' and 7, 7'. In the event of failure of network 2, actuation of the brake pedal *1f* will nevertheless force hydraulic fluid through network 3 to the cylinders 6, 6' and 7, 7' of all of the wheel brakes, thereby bringing the respective brakes *6a*, *6a'* and *7a*, *7a'* into engagement with the disks FD and FD', RD and RD'.

Advantageously, the disks are of the axially shiftable type and are keyed to their respective wheel shafts so that full braking effectiveness is achieved by displacement of the respective disks outwardly until the pistons of the cylinders 4, 4', 5 and 5' bottom in their respective cylinder and the braking portion of the disk is sandwiched between the pairs of brakeshoes of each wheel brake. Disks of this type are illustrated and described in the commonly assigned U.S. Patent No. 3,295,640 and in the commonly assigned copending applicaton, Ser. No. 622,718 entitled "Disk-Brake System With Floating Brake Disk," filed by Friedrich Beuchle on Mar. 13, 1967.

Upon failure of the inboard brake network 3, hydraulic fluid will continue to be supplied by the network 2 to the outboard brake cylinders 4, 4', 5, 5' and the corresponding brakeshoes will urge the disks against the inboard brakeshoes and thereby clamp the disks to hold the vehicle. The inboard, rear-wheel-brake cylinders 7, 7' of one hydraulic network (network 3) are provided with respective locking devices 8, 8' which are represented by the levers *8a* and *8a'* carried by the brake housing and of the type described in connection with FIG. 4 or 5 for locking the corresponding pistons and their brakeshoes *7a*, *7a'* in their advanced position in engagement with the respective disks RD, RD'. The levers *8a* and *8a'* on the locking devices 8, 8' are actuated by bowden flexible-cable means 9 and 9' which, in turn, are actuated manually from the operated seat of the vehicle by the control means represented at 10. Thus, the wire *9a*, *9a'* extending through the respective flexible sheath *9b*, *9b'* is attached to the corresponding levers *8a*, *8a'*, while the end of this sheath is fixed to the brake housing to permit relative movement of the core wire *9a*, *9a'* with respect to the sheaths *9b*, *9b'*. At the actuating end of the cables 9, 9', the lever *10a*, which is pivoted to the vehicle body at *10b*, draws the wire *9a*, *9a'* in the direction of arrow *10c* via a link *10d*, while the sheaths *9b*, *9b'* of the flexible cables are rigid with the vehicle body via a sleeve *10e*. The locking devices only require light tension on the wire; the lever *10a* may be releasably retained in place by conventional detents to hold the locking devices in their engaged position until the operator desires their release.

Thus, actuation of the brake pedal 1f to energize the cylinders 7, 7', advancing the brakeshoes 7a, 7a', can be followed by actuation of the lever 10a of the control 10 to lock these brakeshoes against the disk by preventing retraction of the respective piston (see FIGS. 4 through 7 and as described below). Only the minor resistance of the moving parts need be overcome by the cable tension. When it is desired to release the brake lock, the lever 10a is operated in the opposite sense to retract the locking member from the piston and permit the latter to restore itself to its original position preparatorily to hydraulic actuation at a later time. This locking mechanism is, however, ineffective when the inboard hydraulic network 3 fails and only the outboard network 2a is operative.

Figure 2:
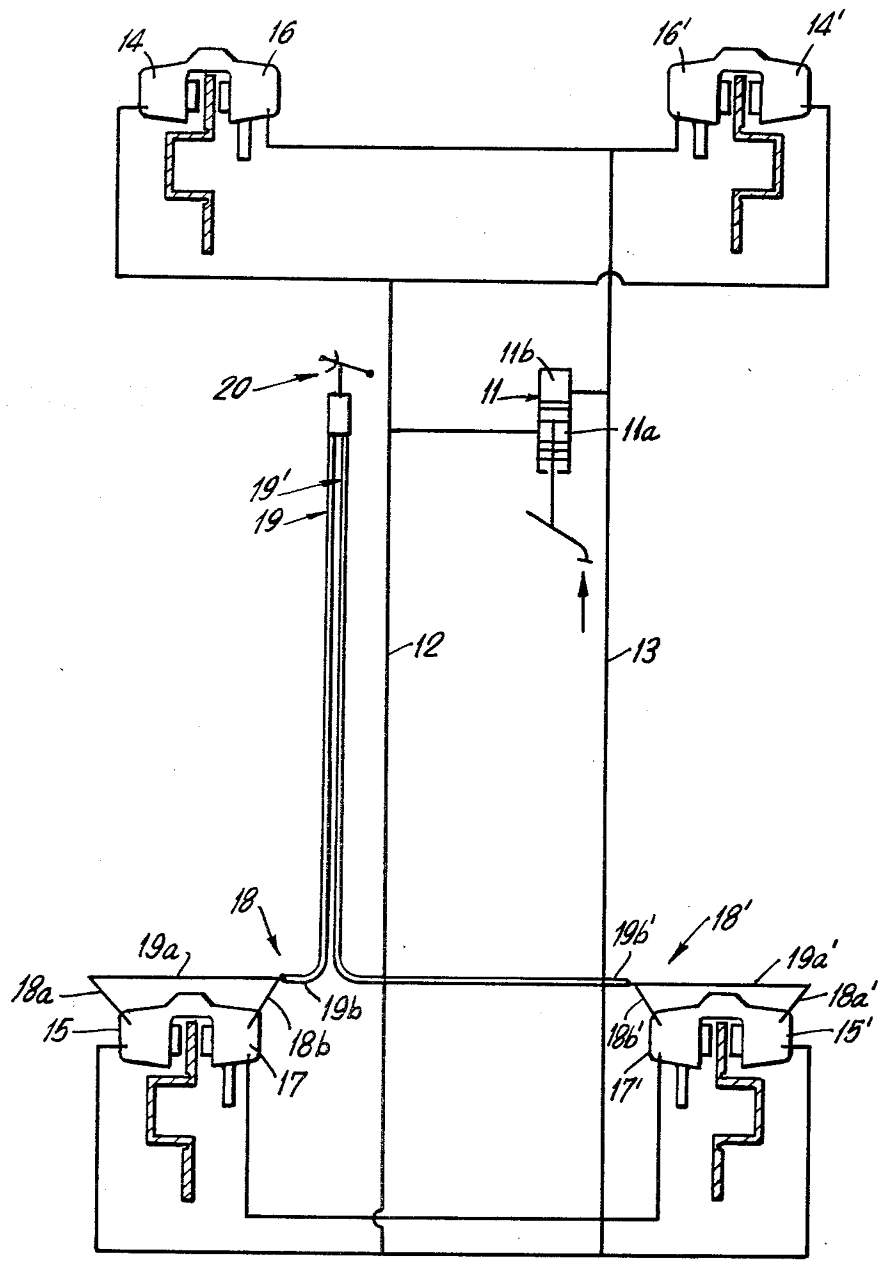
FIG. 2 is a diagram similar to FIG. 1 illustrating a modification of the system thereof.

In FIG. 2, we show a modified system generally similar to FIG. 1 wherein the front-wheel brakes comprise dual-cylinder disk brakes whose inboard cylinders 16 and 16' are connected to the hydraulic network 13 which is energized via section 11b of the master-brake cylinder 11. The outboard cylinders 14 and 14' of the front-wheel brakes are connected via the network 12 to the section 11a of the tandem master cylinder in parallel with the outboard wheel-brake cylinders 15 and 15' of the rear-wheel brakes. Similarly, the inboard wheel-brake cylinders 17 and 17' of the latter are connected to the hydraulic network 13 in parallel with the inboard front-wheel brake cylinders. Both brake cylinders 15 and 17, 15' and 17' of the rear-wheel brakes can be provided with locking devices 18 and 18' which follow the respective pistons and prevent outward movement thereof from the position of engagement with the brake disk when the brakes are applied and the locking mechanism is set. The cylinders 15 and 17, therefore, are provided with respective lock-operating levers 18a and 18b, while the cylinders 15' and 17' are provided with the levers 18a' and 18b' of the respective locking devices. The cables 19 and 19', which are concurrently actuated via the manually operable lever 20, have their sheaths 19, 19b' respectively connected with the levers 18b and 18b', whille their core wires 19a, 19a' are tied to the levers 18a and 18a'. In this arrangement, failure of one of the hydraulic networks 12 or 13, while the other remains operative, nevertheless permits the locking device to be used, thereby retaining the operative hydraulic brake at the respective rear wheel, in engagement with the corresponding disk.

Figure 3:
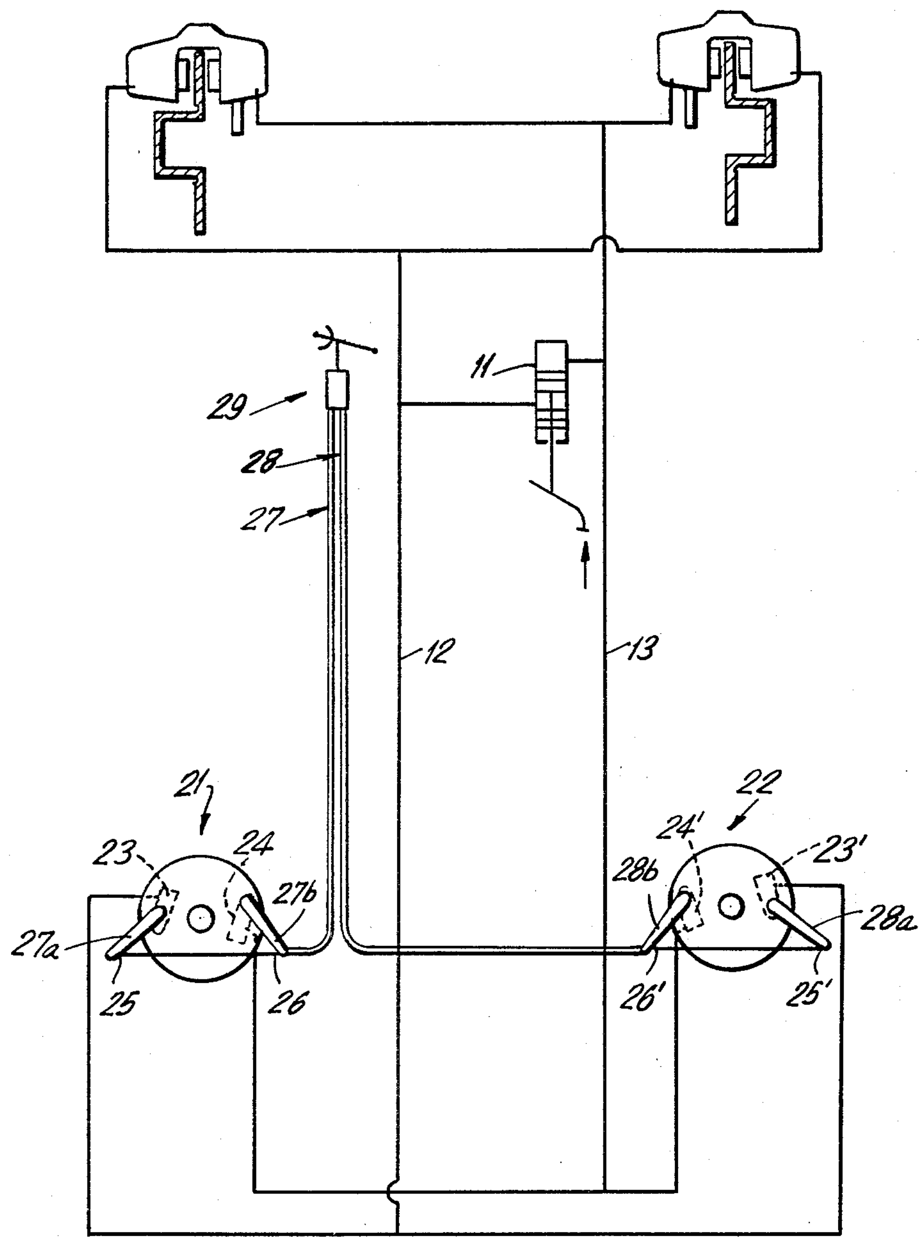
FIG. 3 is a diagram of a dual-brake-system-utilizing drum or internal-expansion brakes in conjunction with disk brakes in a duel-brake system embodying this invention.

The system of FIG. 3 represents a slightly different brake arrangement wherein the rear-wheel brakes 21 and 22 are constituted as drum-type or internal-expansion brakes (see Principles of Automotive Vehicles, U.S. Government Printing Office, 1956, Washington, D.C.) The brake cylinders 23 and 24 of the internal-expansion brake 21 and the corresponding cylinders 23', 24' of brake 22 are respectively connected to the hydraulic networks 12 and 13 of the tandem master cylinder 11. The front brakes, of course, are constituted as described in FIGS. 1 and 2. Each of the cylinders 23, 24, 23' and 24' is provided with a respective locking device whose levers 27a and 27b, 28a, 28b are shown to be connected to one of the flexible cables 27 or 28 which are jointly actuated by the control-lever arrangement 21. Thus, the levers 27a and 28a of the outboard wheel cylinders 27 and 23' are connected to the core wires of the respective cables 27 and 28, whereas the levers 27b, 28b are connected with the sheaths of these cables. The construction of the locking devices of this system can be identical to that illustrated either in FIG. 6 or in FIG. 7.

Figure 4:
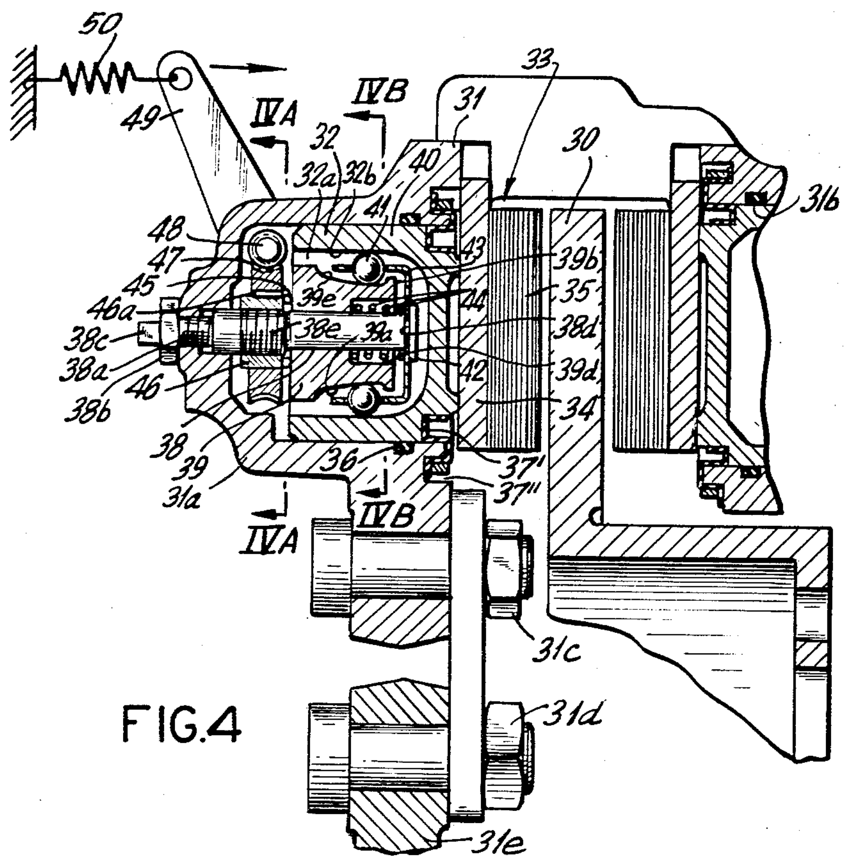
FIG. 4 is a fragmentary axial cross-sectional view of a disk-brake installation suitable for use in the systems of FIGS. 1 and 2 and illustrating one type of locking means according to our invention.

In FIG. 4, we show a disk brake for use in the systems of FIGS. 1 and 2, for example, each of the cylinders of which can be provided with a locking device, although a single locking device is illustrated. The disk brake here comprises a brake disk 30 whose periphery is surrounded at least in part by a brake housing or yoke 31 carrying two hydraulic cylinders one of which is represented as 31a, while the other is shown as 31b. In general, the constructions of these two cylinders are identical. Within the cylinder 31a, a hollow piston 32 is shiftable perpendicularly to the disk 30 and parallel to its axis of rotation by the introduction of fluid under pressure to the cylinder 31a via a conventional inlet not shown. The piston 32 bears upon the backing plate 34 of the brakeshoe 33 whose lining 35 frictionally engages the disk 30 when it is brought into engagement therewith by the piston 32. The piston 32 cooperates with a sealing ring 36 to prevent escape of fluid from the cylinder 31 and also form a seat at 37' for a protective flexible cap 37 which is seated in the groove 37'' of the housing 31 and prevents dirt or contaminants from entering the cylinder or impeding displacement of the piston 32.

The brake housing 31 is formed with a bolt 38 which extends axially into the cylinder 31a and the central cavity 32a of the piston 32, the bolt 38 being adjustable via a shank 38a threaded into the housing 31 and locked in place by a nut 38b forwardly of its polygonal head 38c.

At its forward end, the bolt 38 is formed with a flange 42 constituting an abutment or a ball cage 43 which is held in a groove 38d of the bolt 38 and constitutes, with the angularly spaced balls 41 (see FIG. 4B), a roller-type locking device as represented at 40. The balls 41 are contained between the cylindrical wall 32b of the piston 32 and the forwardly converging frustoconical wall 39a of a bushing 39 axially shiftable along the bolt 38. The bushing 39 is, moreover, provided with a pair of axially spaced abutments 39b and 39c forming stops for the balls 41 and is urged to the left by a compression spring 44 disposed in an axially open recess 39d of the bushing 39 around the bolt 38 and against the cage 43. This spring thus retains the bushing 39 axially against the thrust bearing 45 which, in turn, rests against a nut 46 keyed at 46a to a worm wheel 47 in mesh with the worm 48 of a shaft 48a journaled in the housing 31 and rotated by an actuating lever 49. The latter can be drawn to the right (clockwise in FIG. 4) against the restoring force of the spring 50 by one of the cables 9, 9' or 19, 19' (FIG. 1 or 2). Thus, the lever 49 is swingable in a vertical plane (i.e. the plane of the paper of FIG. 4) perpendicular to the direction of travel of the vehicle. The housing 31 is attached via bolts 31c and 31d to the axle housing 31e of the vehicle.

Figures 4A, 4B:
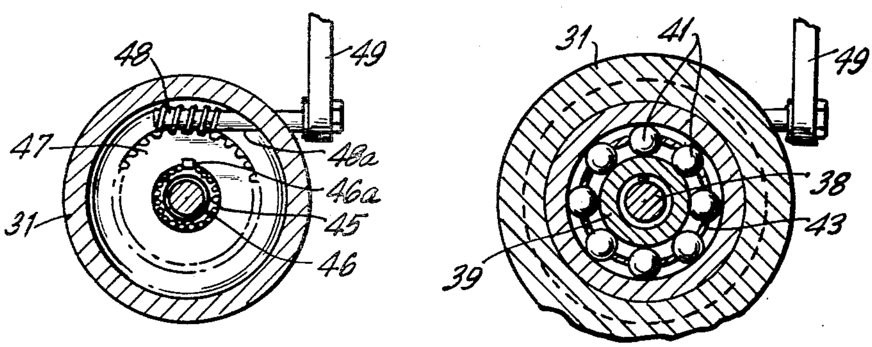
FIG. 4A is a cross-sectional view taken along the line IVB—IVB of FIG. 4.
FIG. 4B is a cross-sectional view taken along the line IVB—IVB of FIG. 4.

Upon actuation of the brake of FIGS. 4, 4a and 4b, hydraulic fluid is forced into the cylinders 31a and 31b to urge the pistons (e.g. piston 32) toward the brake disk 30, thereby bringing the brakeshoes 33 into frictional engagement therewith. Upon release of the brake pedal, hydraulic fluid is returned to the master cylinder and the piston 32 moves away from the disk 30. In the hydraulically actuated condition of the brake, however, the piston 32 is in its extreme right-hand position and can be locked in this advanced position by remote actuation of the levre 49 via the corresponding flexible cable 9, 9', 19, 19'. When the lever 49 is thus rotated in the clockwise sense (FIG. 4) against the tension of spring 50, the worm 48 drives the worm wheel 47 and the nut 46 with respect to the threaded portion 38e of the bolt upon which the nut is mounted. An axial thrust is applied by the nut 46 via the thrust bearing 45 to the axially shiftable bushing 39 against the force of spring 44. The balls 41 of cage 43 thus ride along the conical surface 39a until the balls 41 are wedged thereby firmly against the cylindrical wall 32b of the piston 32, thereby immobilizing the piston with respect to the bushing 39. Thus the nut 46 forms a spindle which, together with the camming member 39 follows the movement of the piston 32 and brings the locking device 40 to bear thereon, thereby retaining the piston in its advanced position. The brake is locked in its engaged condition for emergency-brake and parking-brake purposes. Upon release of the brake pedal, the piston 32 remains in its extreme right-hand position until the locking means is again released. The reaction force of the piston 32 against the locking means is transferred to the bushing 39 and, via a thrust bearing 45, against the nut 46 and the rigid spindle or bolt 38 which, in turn, applies the reaction force to the housing 31.

To release the locked brake, the cable to the driver's seat is relaxed and the restoring spring 50 returns lever 49 in the counterclockwise sense (FIG. 4) to rotate the worm wheel 47 in opposite direction. The bushing 39 is then moved to the left (FIG. 4) by the coil spring 44 to increase the gap between the portion of the surface 39*a* and the portion of the surface 32*b* engaged by the balls 41. The friction force of these balls upon the surface 32*b* is thereby relieved and the piston 32 permitted to move to the left and withdraw the brakeshoe 33 from its engaged position with respect to the disk 30.

Figure 5:
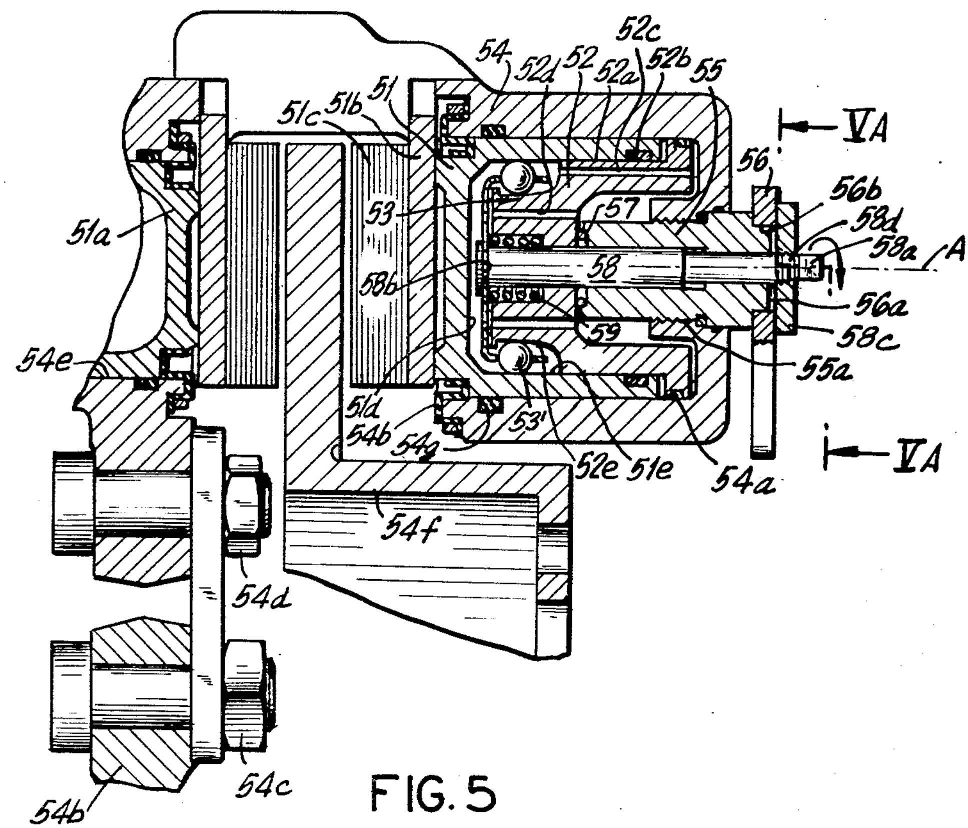
FIG. 5 is an axial cross-sectional view through a portion of another disk-brake assembly according to the invention.
Figure 5A:
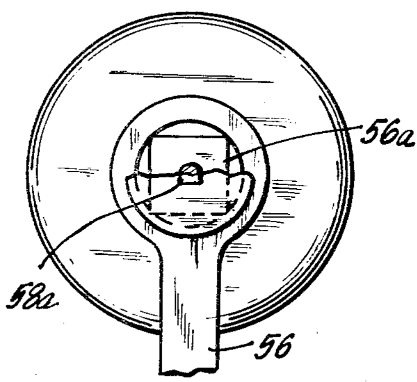
FIG. 5A is a cross-sectional view taken along the line VA—VA of FIG. 5.

In FIG. 5, we show an embodiment of a disk-brake locking system which can be used when the actuating lever 56, to which the flexible cable is attached, is to rotate about the axis A of the hydraulic cylinder 54*a* of the device, i.e. in a plane parallel to the plane of the disk and to the direction of movement of the vehicle. In this brake system, the piston 51 is axially shiftable within the cylinder 54*a* formed by the brake housing 54 which is affixed to the axle housing 54*b* by bolts 54*c* and 54*d*. A similar brake cylinder 54*e* and piston 51*a* is disposed on the other side of the brake disk 54*f*. A seal 54*g* is provided between the piston 51 and the housing 54 to prevent escape of hydraulic fluid from the cylinder, while a dust cap 54*h* interconnects the extremities of the piston 51 and the housing 54 as described earlier in connection with the disk brake of FIG. 4.

The piston 51 bears upon the braking plate 51*b* of a brakeshoe whose lining 51*c* is adapted to engage an annular surface of the brake disk 54*f*. The piston 51 is, moreover, provided with an inner cavity 51*d* whose cylindrical wall 51*e* forms a guide for an axially movable bushing 52 of piston configuration, this bushing 52 forming a counterpiston displaceable by fluid pressure differential as described hereinafter. The bushing 52 is, moreover, sealingly guided via its boss 52*a* along the cylindrical wall 51*e* of the piston 51 and sealed against fluid leakage by a sealing ring 52*b*. Bores 52*c* and 52*d* in the bushing permit hydraulic fluid to flow behind it. A coil spring 59, surrounding a bolt 58, urges the bushing 52 to the right (FIG. 5) and holds it against a thrust bearing 57 which, in turn, transfers axial pressure to and from a threaded spindle 55. The latter coaxially surrounds the bolt 58 and is threaded at 55*a* into the housing 54 so that, upon rotation of the spindle 55, the bushing 52 can be displaced to the left and bring its latch mechanism 53 into play. To this end, the left-hand end of the bushing 52 is formed with a frustoconical surface 52*e* tapering axially in the direction of the disk 54*f* while the latch mechanism 53 is formed as a ball cage affixed to the end 58*b* of the bolt 58 and whose balls 53' are wedged against the cylindrical wall 51*e* of the piston when the bushing 52 is urged to the left. The prismatic head 56*a* of the spindle 55 is engaged by the complementarily shaped socket 56*b* of the lever 56. The position of the ball cage 53 is established by locking a nut 58*c* to the thread 58*d* thereof upon rotation of the prismatic head 58*a* via a wrench.

When hydraulic fluid is supplied to the cylinder 54*a*, the piston 51 is displaced to the left to urge the brake lining 51*c* against the disk 54*f*. Concurrently, hydraulic fluid is supplied to the bushing 52 which forms a differential piston tending to follow the piston 51*d* but without movement relatively thereto. Upon rotation of the spindle 55 via lever 56, however, the bushing 52 is urged to the left against the coil spring 59 and wedges the balls 53' outwardly to lock the piston 51 in place. Upon relaxation of the hydraulic-brake pressure, the piston will be retained in its advanced position. To release the lock, the reverse rotation of spindle 55 permits the spring 59 to urge the bushing 52 to the right and release the balls 53'.

In the modification of FIG. 6, which is used in a drum-type brake system as illustrated in FIG. 3, the individual brakeshoes of these drums are actuated by respective cylinders (see Principles of Automotive Vehicles, supra. Each of the cylinders can then be constituted of the construction illustrated in FIG. 6. The cylinder housing 60 forms a cylinder 60*a* in which the piston 64 is axially shiftable when hydraulic fluid is fed to the brake via a fitting 60*b*. A seal 64*a* in this piston 64 prevents escape of hydraulic fluid from the cylinder while a dust cap 60*c* is applied between the adjustment stud 66 and the housing 60 to prevent entry of contaminants into the system. A locking member is formed by a bolt 61 which is threaded into the cylinder housing 60 and bears axially upon the piston 64, while being provided with an O-ring seal 63 outwardly of the thread 61*a* of this bolt. The prismatic head 61*b* thereof is engaged by a lever 62 with a correspondingly shaped socket 62*a*. The lever 62 can be displaced by the flexible cables 27, 28 illustrated in FIG. 3. The piston 64 acts against the restoring force of a coil spring 64*b* while a friction disk 65 is shifted with the piston 64 along the self-adjustment, force-transmitting stud 66. Another friction disk 67 engages the stud 66 while a split ring 69 forms a right-hand stop for this axially shiftable friction disk. The split ring 68 forms the inner stop therefor and a seat for the spring 64*b*.

When hydraulic fluid is fed to the cylinder 60*a*, the piston 64 is shifted to the right to actuate the brakeshoe (not shown) so that the hydraulic force is applied to the latter via the piston 64, the friction disk or pawl 65 and the stud 66. In this position, the brakeshoe can be locked by rotation of the lever 62 and the bolt 61 to bring the latter to bear against the piston 64. Release of the brake pedal permits the system to drain back, without, however, relieving the brake which is held in place by the bolt 61. The friction disk 67 advances the stud 66 with respect to the piston 64 to compensate for wear of the brakeshoe. When the lever 62 is rotated in the other sense, the piston 64 is allowed to return to the left to relieve the brake. The self-adjustment effected via the friction disks 65 and 67 and the stud 66 permits the stroke of the piston 64 to remain constant. The self-locking character of the bolt 61 prevents the reaction force from driving the lever 62.

In FIG. 7, there is illustrated a modification of the system of FIG. 6 wherein the threaded bolt 70 is of prismatic cross-section and is rotated by a worm wheel 72. The latter is driven by the worm 71 whose shaft 73 is turned by a locking lever 75 which is keyed to the shaft. The lever 75 thus is swung in a plane parallel to the axis of the cylinder 74. The latter slidingly receives the piston 76 and is provided with self-adjustment means similar to that of the brake of FIG. 6 and thereby operates in a similar manner.

The invention described and illustrated is believed to admit of many modifications within the ability of persons skilled in the art, all such modifications being considered within the spirit and scope of the appended claims.

We claim:

1. In a hydraulic brake comprising at least one hydraulic cylinder energizable with a hydraulic fluid to shift a piston in said cylinder in an axial direction and advance same to urge a brakeshoe against a braking surface, the improvement which comprises releasable locking means in said cylinder operable upon hydraulic advance of said piston for retaining same in its advanced position upon the hydraulic depressurization of said cylinder, said locking means including an axially shiftable locking member in said cylinder adapted to follow the movement of said piston and engageable therewith to retain said piston in its advanced position, screw-thread means in said cylinder for axially shifting said locking member, said screw thread means including a pair of threadedly interconnected elements formed respectively with mating male and female threads and extending axially in said cylinder, said elements including a rotatable first element and a nonrotatable second element adapted to axially advance said screw-thread means upon rotation of said first element, and a lever swingable on said cylinder and operatively connected with said first element for rotating same, one of said elements being in axial force-transmitting relationship with said member for axially displacing same upon rotation of said first element by said lever.

2. The improvement defined in claim 1 wherein said first element bears axially directly against said piston and is threadedly received in said cylinder.

3. The improvement defined in claim 2 wherein said first element extends axially outwardly from said cylinder and is directly engaged by said lever.

4. In a hydraulic brake comprising at least one hydraulic cylinder energizable with a hydraulic fluid to shift a piston in said cylinder in an axial direction and advance same to urge a brakeshoe against a braking surface, the improvement which comprises:

releasable locking means in said cylinder operable upon hydraulic advance of said piston for retaining same in its advanced position upon the hydraulic depressurization of said cylinder, said locking means including an axially shiftable locking member in said cylinder adapted to follow the movement of said piston and engageable therewith to retain said piston in its advanced position, screw-thread means in said cylinder co-operating said said locking member for shifting the same, and a lever swingable on said cylinder and operatively connected with said screw-thread means for actuating same, said piston being hollow and being formed with an internal wall, said locking member including means engageable with said wall upon advance of said locking member in the direction of movement of said piston for retaining said piston in its advanced position, said screw-thread means including a threaded member rotatable by said lever and bearing axially upon said locking member; and a thrust-type roller bearing interposed between said members.

5. The improvement defined in claim 4 wherein said locking member is a central bushing with a frustoconical surface tapered axially in the direction of advance of said piston and extending therewithin, said locking means including a cage of roller elements surrounding said frustoconical surface and cammable thereby against said wall of said piston upon axial movement of said bushing to follow said piston, a central bolt extending through said bushing and carrying said cage, and spring means between said bolt and said bushing for urging said bushing in a direction tending to release said piston.

6. The improvement defined in claim 4 wherein said threaded member is a spindle and said lever directly engages said spindle and is swingable in a plane perpendicular to the axis of said spindle.

7. The improvement defined in claim 4 wherein said threaded member is provided with a worm wheel and said lever is provided with a worm in mesh with said worm wheel for driving said threaded member.

8. A hydraulic brake system for automotive vehicles comprising a plurality of hydraulically operable wheel brakes, a master cylinder, at least one hydraulic network for communicating hydraulic fluid from said master cylinder to said wheel brakes, and locking means for at least one of said wheel brakes operable upon the hydraulic energization thereof with actuation of said master cylinder for releasably retaining said one of said brakes in its operated position upon inactivation of the master cylinder, said master cylinder having at least two sections and said wheel brakes including at least two sets of hydraulic cylinders operable independently of one another, a pair of hydraulic networks respectively communicating between each of said sections and a respective set of said cylinders, at least one of said locking means being provided in at least one cylinder of each of said sets, the brake cylinders provided with said locking means having pistons axially shiftable in said cylinder, said locking means each including a locking member axially movable in the respective cylinder upon hydraulic advance of the respective piston to retain the latter in its advanced position, screw-threaded means operatively connected with said member for displacing same, and a lever mounted on the respective cylinder and connected with said screw-thread means for controlling said locking member, each of said pistons is hollow and is provided with an internal cylindrical wall, said locking member including a cage of roller elements engageable with said wall and a camming member surrounded by said cage for urging said roller elements into engagement with said wall, said screw-thread means being adapted to displace said camming member to lock and release the piston.

9. The brake system defined in claim 8, wherein said screw-threaded means includes a threaded spindle and a thrust-type ball bearing interposed between said spindle and said camming member.

10. A hydraulic brake system for automotive vehicles comprising a plurality of hydraulically operable wheel brakes, a master cylinder, at least one hydraulic network for communicating hydraulic fluid from said master cylinder to said wheel brakes, and locking means for at least one of said wheel brakes operable upon the hydraulic energization thereof with actuation of said master cylinder for releasably retaining said one of said brakes in its operated position upon inactivation of the master cylinder, said master cylinder having at least two sections and said wheel brakes including at least two sets of hydraulic cylinders operable independently of one another, and a pair of hydraulic networks respectively communicating between each of said sections and a respective set of said cylinders, at least one of said locking means being provided in at least one cylinder of each of said sets, the brake cylinders provided with said locking means having pistons axially shiftable in said cylinder, said locking means each including a locking member axially movable in the respective cylinder upon hydraulic advance of the respective piston to retain the latter in its advanced position, screw-thread means operatively co-operating with said member for displacing same, said screw-thread means including a pair of threadedly interconnected elements formed respectively with mating male and female threads and extending axially in said cylinder, said elements including a rotatable first element and a nonrotatable second element adapted to axially advance said screw-thread means upon rotation of said first element, and a lever mounted on the respective cylinder and connected with said first element for controlling said locking member.

11. The brake system defined in claim 10 wherein said first element bears upon said piston, said brake further comprising a worm/worm-wheel drive interconnecting said threaded element and said lever.

12. The brake system defined in claim 10, further comprising flexible-cable means operable from the driver's seat of the vehicle and connected with said levers, said screw-thread means being self-blocking to prevent the application of reaction force to said flexible-cable means.

References Cited

UNITED STATES PATENTS

| | | | |
|---|---|---|---|
| 794,882 | 7/1905 | Pagenhart | 92—13 X |
| 2,815,104 | 12/1957 | Du Shane | 188—265 |
| 3,156,325 | 11/1964 | Taylor | 188—73 |
| 3,205,020 | 9/1965 | Schubert | 303—89 X |
| 3,337,009 | 8/1967 | Meier | 188—152 |

MILTON BUCHLER, *Primary Examiner.*

GEORGE E. A. HALVOSA, *Assistant Examiner.*